(12) United States Patent
Shyr et al.

(10) Patent No.: US 7,203,048 B2
(45) Date of Patent: Apr. 10, 2007

(54) DC TO DC CONTROLLER WITH INRUSH CURRENT PROTECTION

(75) Inventors: You-Yuh Shyr, San Jose, CA (US); Constantin Bucur, Santa Clara, CA (US); Vlad Popescu-Stanesti, San Jose, CA (US)

(73) Assignee: 02Micro International Limited, Georgetown Grand Cayman (KY)

( * ) Notice: Subject to any disclaimer, the term of this patent is extended or adjusted under 35 U.S.C. 154(b) by 396 days.

(21) Appl. No.: 10/431,815

(22) Filed: May 8, 2003

(65) Prior Publication Data

US 2004/0080891 A1 Apr. 29, 2004

Related U.S. Application Data

(63) Continuation-in-part of application No. 10/279,345, filed on Oct. 24, 2002, now Pat. No. 6,989,981.

(51) Int. Cl.
*H02H 7/00* (2006.01)

(52) U.S. Cl. ......................................... 361/93.9; 361/18

(58) Field of Classification Search .................. 361/18, 361/91.1, 91.2, 91.4, 93.7, 93.8, 93.9, 111; 320/136, 141, 106, 116, 118, 128, 134
See application file for complete search history.

(56) References Cited

U.S. PATENT DOCUMENTS

| | | | |
|---|---|---|---|
| 5,187,425 A | 2/1993 | Tanikawa | 320/31 |
| 5,204,611 A | 4/1993 | Nor et al. | 320/21 |
| 5,465,039 A | 11/1995 | Narita et al. | 320/32 |
| 5,610,503 A | 3/1997 | Fogg et al. | 323/283 |
| 5,654,622 A * | 8/1997 | Toya et al. | 320/129 |
| 5,694,025 A | 12/1997 | Oglesbee et al. | 320/49 |
| 5,698,964 A | 12/1997 | Kates et al. | 320/22 |
| 5,723,970 A | 3/1998 | Bell | 320/30 |
| 5,726,554 A | 3/1998 | Freiman et al. | 320/21 |

(Continued)

FOREIGN PATENT DOCUMENTS

JP  6-141476  5/1994

OTHER PUBLICATIONS

Taiwan Office Action dated Dec. 13, 2004, with English translation, from related Taiwan application (3 pgs).

(Continued)

*Primary Examiner*—Brian Sircus
*Assistant Examiner*—Danny Nguyen
(74) *Attorney, Agent, or Firm*—Grossman, Tucker, Perreault & Pfleger, PLLC (57) ABSTRACT

A DC to DC controller for controlling an inrush current from a DC to DC converter to a battery system having an internal isolating switch. The DC to DC controller is configured to control the DC to DC converter based on a state of the internal isolating switch. If the switch is open, the DC to DC controller adjusts the output voltage of the DC to DC converter to a predetermined voltage level. Based on the value of such voltage level, in rush current from the DC to DC converter to the battery system can be reduced or eliminated when the isolating switch changes from an open state to a closed state. An electronic device including such a DC to DC controller is provided. Related methods for controlling inrush current are also provided.

15 Claims, 4 Drawing Sheets

U.S. PATENT DOCUMENTS

| | | | | |
|---|---|---|---|---|
| 5,764,035 | A * | 6/1998 | Lee | 320/160 |
| 5,898,234 | A | 4/1999 | Kitagawa | 307/48 |
| 5,982,148 | A | 11/1999 | Mercer | 320/134 |
| 5,994,875 | A | 11/1999 | Lee | 320/132 |
| 6,031,359 | A | 2/2000 | Michelsen et al. | |
| 6,118,254 | A | 9/2000 | Faulk | 320/141 |
| 6,137,267 | A | 10/2000 | Kates et al. | |
| 6,181,107 | B1 | 1/2001 | Hirose | 320/134 |
| 6,184,660 | B1 | 2/2001 | Hartular | 320/141 |
| 6,246,215 | B1 | 6/2001 | Popescu-Stanesti | 320/139 |
| 6,326,771 | B1 | 12/2001 | Popescu-Stanesti | 320/139 |
| 6,329,796 | B1 | 12/2001 | Popescu | 320/134 |
| 6,459,602 | B1 | 10/2002 | Lipcsei | 363/132 |
| 6,498,461 | B1 | 12/2002 | Bucur | 320/145 |
| 2004/0080892 | A1 * | 4/2004 | Popescu-Stanesti et al. | 361/93.9 |

OTHER PUBLICATIONS

English translation of China Office action dated Jun. 9, 2006 from related China application (1 pg).

* cited by examiner

DC TO DC CONTROLLER WITH INRUSH CURRENT PROTECTION

The present invention is a continuation-in-part application of U.S. patent application Ser. No. 10/279,345 filed Oct. 24, 2002, now U.S. Pat. No. 6,989,981, the teachings of which are incorporated herein by reference.

FIELD OF THE INVENTION

This invention relates to power management in electronic devices and in particular to a DC to DC controller with inrush current protection.

BACKGROUND OF THE INVENTION

Portable electronic devices such as laptop computers, cell phones, pagers, personal digital assistants, and the like are becoming more common in today's society as the capabilities and uses of such devices continues to expand. Many portable electronic devices are powered by a rechargeable battery, e.g., lithium, nickel-cadmium, or nickel-metal hydride type batteries, to facilitate the portable nature of such devices. Such portable electronic devices may also be powered by a DC power source when the situation permits, e.g., an AC/DC adapter plugged into a conventional AC outlet. Such a DC power source may also provide power to recharge the rechargeable battery in a battery charging mode.

In such a battery charging mode, various portable electronic devices may also have a DC to DC converter to accept unregulated power from the DC power source and to provide regulated DC power to recharge the rechargeable battery. The DC to DC converter may be controlled by a DC to DC controller. The DC to DC controller may accept a variety of input signals representative of various supply and charging conditions. For instance, one input may be representative of the DC power source supply current, another may be representative of an output charging current, and yet another representative of an output charging voltage. The DC to DC controller may also have a variety of control path or loops associated with each input signal, e.g., an input supply current control path, an output charging current control path, and an output charging voltage control path. The DC to DC controller then provides a control signal to the DC to DC converter based on at least one of these input signals to control the output charging power level to the rechargeable battery.

Some rechargeable batteries have an internal switch that when open electrically isolates the battery cells from other components, e.g., the DC to DC converter if the battery is being recharged. Such an internal switch may open in a variety of circumstances. For example, such a switch may open for self-calibration reasons so the battery can monitor its voltage levels on its battery cells without a flowing current. Such a switch may also open for protection reasons, e.g., when instantaneous power delivered to the battery exceeds the maximum allowed power for the battery.

The opening and closing of such a switch can cause in-rush current problems. For instance, when such a switch is open during a battery charging mode, the DC to DC controller senses that the charging current has decreased to zero. In response to this sensed condition, the DC to DC controller may increase the DC to DC output voltage level until it reaches some predetermined maximum level. Then, once the battery's internal switch is closed again, a large in-rush current may be created due to the potential difference between the output voltage of the DC to DC converter and the voltage of the battery. Such a large in-rush current may lead to failure or degradation of the rechargeable battery and associated electronics. The amplitude of the in-rush current depends primarily on the magnitude of the voltage difference. The duration of the in-rush current depends on a number of factors including the speed of the current control path or loop of the DC to DC controller and the capacitance value of an output capacitor to name a couple.

Accordingly, there is a need for a DC to DC controller and method that overcomes the above deficiencies in the prior art and is capable of controlling in-rush current.

BRIEF SUMMARY OF THE INVENTION

A DC to DC controller for controlling an inrush current from a DC to DC converter to a battery system having an internal isolating switch consistent with the invention includes a first path, a second path, and a regulating circuit. The first path is configured to accept a first input signal representative of an output power level of the DC to DC converter and is configured to provide a first control signal. The second path is configured to accept the first input signal and is configured to provide a second control signal if the internal isolating switch is in an open state. The regulating circuit is configured to accept the first and second control signals and to regulate the output power level to a first level if controlled by the first control signal and to regulate the output power parameter to a second level if controlled by the second control signal.

In another embodiment of the invention, an electronic device is provided. The electronic device includes a battery system including a rechargeable battery and an internal isolating battery switch coupled to the rechargeable battery; a DC to DC configured to accept an input power level from a DC power source and provide an output power level to the battery system for recharging the rechargeable battery; and a DC to DC controller for controlling an inrush current from the DC to DC converter to the battery system. The DC to DC controller includes a first path configured to accept a first input signal representative of the output power level, the first path configured to provide a first control signal; a second path configured to accept the first input signal and provide a second control signal if the internal isolating battery switch is in an open state; and a regulating circuit configured to accept the first and second control signals and to regulate the output power level to a first level if controlled by the first control signal and to regulate the output power level to a second level if controlled by the second control signal.

In another embodiment consistent with the invention, an electronic device is provided. The electronic device includes a battery system including a rechargeable battery and an internal battery switch coupled to the rechargeable battery; a DC to DC converter configured to accept an input power level from a DC power source and provide an output power level to the battery system for recharging the rechargeable battery; and a DC to DC controller configured to control the DC to DC converter based on a state of the internal battery switch.

In yet another embodiment of the invention, a method of controlling inrush current from a DC to DC converter to a battery system having an internal battery isolating switch is provided. The method includes: detecting a state of the internal battery isolating switch; and adjusting an output voltage level of the DC to DC converter to a predetermined output voltage level if the state of the internal battery switch is an open state.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
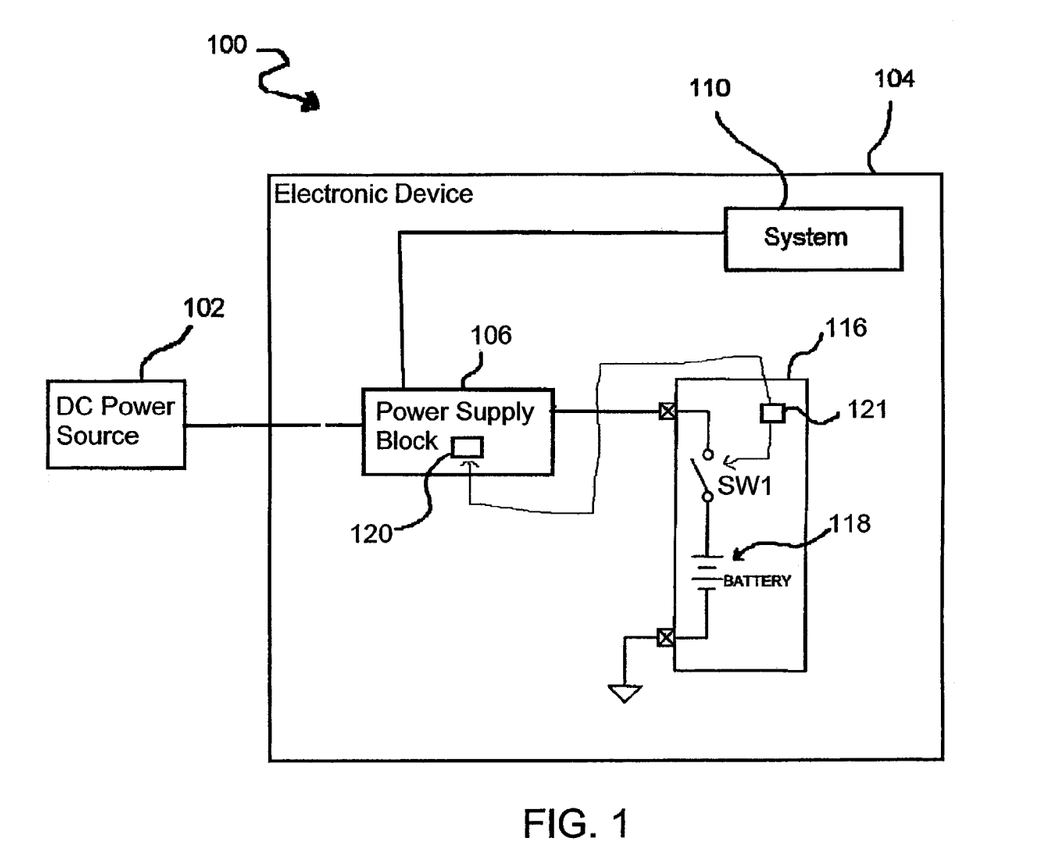
FIG. 1 is a block diagram of an exemplary electronic device including a DC to DC converter system having a DC to DC controller consistent with the present invention.

Turning to FIG. 1, a simplified block diagram of an electronic device 104 and a DC power source 102 is illustrated. The electronic device 104 may be a portable device such as a laptop computer, cell phone, pager, personal digital assistant, and the like. In general, the electronic device 104 includes a power supply block 106, a battery system 116, and system circuitry 110. In general, the power supply block 106 may include various components to monitor, control, and direct power from each power source (DC power source 102, battery system 116) to each other and the system 110 of the device 104 under various conditions. One such component of the power supply block 106 includes DC to DC converter system 120 that may be utilized to provide a charging current to the battery 118 if a DC power source 102 of suitable characteristics is present and the battery 118 is in need of charging.

To recharge the battery and/or to supply power to the electronic device 104, a DC power source 102 may be coupled to the device 104. The DC power source 102 may be an AC/DC adapter which is configured to receive conventional AC voltage from an outlet and convert it to a DC output voltage. The DC power source 102 may also be a DC/DC adapter such as a "cigarette lighter" type adapter configured to plug into that type of socket. Such a power source 102 is illustrated in FIG. 1 as separate from the electronic device 104, but it may be built into some devices.

The battery system 116 includes a rechargeable battery 118 and an internal isolating switch SW1 that when open electrically isolates the rechargeable battery 118 from the power supply block 106 and any other electrical components coupled to the battery system 116. The rechargeable battery 118 may be lithium, nickel-cadmium, nickel-metal hydride batteries, or the like. Although further description herein is with reference to one battery 118, those skilled in the art will recognize that any number of batteries may be utilized. The internal isolating switch SW1 is normally closed but may be opened under a variety of circumstances. For example, such the switch SW1 may open for self-calibration reasons so the battery can monitor its voltage levels on its battery cells without a flowing current. Such a switch may also open for protection reasons, e.g., when instantaneous power delivered to the battery exceeds the maximum allowed power for the battery. The switch SW1 may be controlled by a battery switch controller 121 integral with the battery system 116 or from any other switch controller.

Advantageously, as further detailed herein, the DC to DC converter system 120 is responsive to the switch state of switch SW1 such that if switch SW1 is open while in battery charging mode, the DC to DC converter will reduce its output voltage to a predetermined output voltage level. The predetermined output voltage is designed to be within a predetermined range of the minimum battery voltage level to achieve a desired maximum difference in voltage level. By controlling the difference in voltage level, inrush current can be controlled such that when switch SW1 closes again inrush current to the battery 118 can be kept at a sufficiently low level. In addition, the inrush current may be eliminated by adjusting the predetermined output voltage level of the DC to DC converter to be equal to or less than a minimum battery voltage. The switch controller 121 that provides the control signal to the switch SW1 may also provide a control signal to the DC to DC converter system 120. Alternatively, the DC to DC controller portion of the DC to DC converter system 120 may be equipped with switch state detection circuitry to detect the state of the switch SW1 as further detailed herein.

Figure 2:
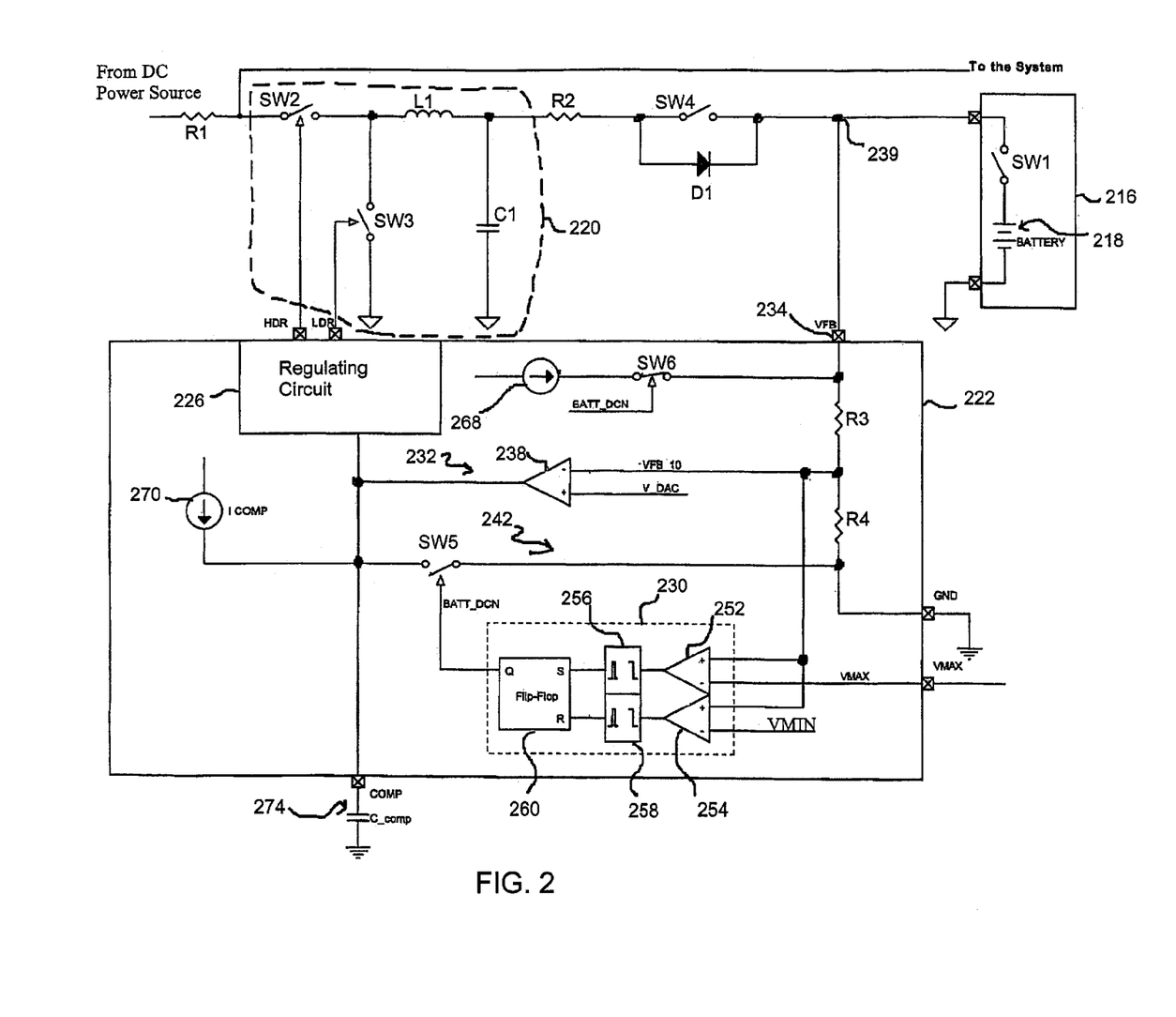
FIG. 2 is a block diagram of one embodiment of a DC to DC controller consistent with the invention for controlling inrush current to a battery system with an internal isolating switch.

Turning to FIG. 2, a more detailed block of one embodiment of a DC to DC controller 222 for controlling inrush current provided by the DC to DC converter 220 to the battery 218 of the battery system 216 is illustrated. During a charge mode, switch SW4 is closed to provide a charging conductive path from the DC to DC converter 220 to the battery system 216. Other switches (not shown) may also be closed to enable the DC power source to supply power to the system as well. In this embodiment, the DC to DC controller 222 includes a switch state detection circuit 230 to detect the state of the internal switch SW1 of the battery system 216.

The DC to DC converter 220 may be a conventional DC to DC converter known in the art. In one exemplary embodiment, the DC to DC converter may be a buck converter having a high side switch SW2, a low side switch SW3, and an LC filter having an inductor L1 and a capacitor C1. A DC to DC controller 222 consistent with the invention controls the state of the high side switch SW2 and the low side switch SW3 such that the switches alternate between a "switch ON" and a "switch OFF" state. In a switch ON state, switch SW2 is ON and SW3 is OFF. In a switch OFF state, switch SW2 is OFF and SW3 is ON. As such, output voltage of the buck converter increases during the switch ON state and decreases during the switch OFF state. Switching is controlled to provide a desired output charging voltage and current to the battery 218 of the battery system 216 under various conditions, e.g., when the switch SW1 of the battery system 216 is open as is further detailed herein.

In general, a DC to DC controller 222 consistent with the invention accepts a variety of input signals representative of various conditions and has a variety of internal control paths that provide associated control signals to a regulating circuit 226. The regulating circuit 226 provides an output control signal in response to at least one of the control signals from the various control paths to control the state of the high side switch SW2 and low side switch SW3 of the DC to DC converter 220. The regulating circuit 226 may be a variety of circuits as is known in the art using any variety of output control signals. In one embodiment, the regulating circuit 226 may be a pulse width modulation circuit to provide a pulse width modulated (PWM) control signal to switches SW2 and SW3. As is known in the art, the duty cycle of the PWM control signal may be altered to control the duration of the "switch ON" state and the "switch OFF" state for switches SW2 and SW3. As such, the desired output characteristic can be achieved from the DC to DC converter 220.

For clarity, the DC to DC controller 222 does not show all possible control paths. For instance, a power supply current control path may accept an input signal from the sense resistor R1 representative of the supply current from the DC power source. In addition, a charging current control path may accept an input signal from the sense resistor R2 representative of a charging current provided to the battery system 216. Again for clarity, such power supply and charging current control paths are not illustrated in the DC to DC controller 222.

The DC to DC controller 222 includes a normal voltage control path 232 from terminal 234 to the regulating circuit 226. Such normal voltage control path accepts a signal VFB representative of the voltage level at node 239. The normal voltage control path may include a pair of resistors R3 and R4 that form a voltage divider for scaling down the received voltage signal VFB to a lower voltage level signal VFB_10 relative to V_DAC. A comparator 238 receives the scaled down signal VFB_10 and a signal representative of a maximum output voltage level of the DC to DC converter, e.g., V_DAC, and provides an output control signal to the regulating circuit 226 representative of the difference. Advantageously, the DC to DC controller 222 may also include a low voltage control path 242. This control path 242 may be responsive to a battery switch state detection circuit 230 that provides a control signal to control the state of switch SW5. The battery switch state detection circuit 230 may include a first comparator 252, a second comparator 254, a first edge detector 256, a second edge detector 258, and a flip flop 260.

In operation, if the internal switch SW1 of the battery system 216 opens during a battery charging mode, the charging current provided to the battery 218 drops to zero. The normal voltage control loop 232 generally takes over control of the output of the DC to DC converter and attempts to drive the output to a maximum allowable charging voltage level V_DAC. Driving the output of the DC to DC converter to such a V_DAC level could result in a large positive potential difference between the output voltage of the DC to DC converter and the battery system 216. Such a large positive potential difference could then result in an excessive inrush current when the switch SW1 closes.

Advantageously, the switch state detection circuit 230 detects when the switch SW1 is open. As the switch SW1 opens, the voltage output of the DC to DC converter 220 starts to rise. When this voltage level reaches a predetermined level VMAX, of which VMAX is less than V_DAC, the comparator 252 outputs a high signal. The positive edge detector 256 detects this change and provides a pulse to set the output of the flip flop 260. When set, the flip flop 260 provides an output control signal BATT_DCN to close switch SW5 thereby activating the low voltage control loop 242. In addition, the BATT_DCN control signal from the flip flop 260 also opens normally closed switch SW6 coupled to current source 268.

The low voltage control loop 242 then provides a control signal to the regulating circuit 226, which in turn is responsive to such control signal to control the state of the switches SW2 and SW3 to drive the output voltage of the DC to DC converter 220 down to a predetermined voltage value. For instance, when the regulating circuit 226 is a PWM modulation circuit the duty cycle of the PWM signal is reduced. The predetermined voltage level may be set by adjusting the resistor values of resistors R3 and R4 and/or the value of the compensating current provided by current source 270. This level may be provided by the internal trimmed reference.

The switch state detection circuit 230 can also detect when the switch SW1 is closed. Comparator 254 compares a signal representative of the voltage at VFB, e.g., VFB_10 with a predetermined minimum voltage level VMIN. The predetermined minimum voltage level VMIN may be set at a value less than a minimum charge on the battery, e.g., 0.1 volts. Therefore, when SW1 closes, comparator 254 output a high signal. The positive edge detector 258 detects this change and provides a pulse to reset the output of the flip flop 260. As such the output control signal of the flip-flop 260 is representative of a closed internal battery switch SW1. Hence, switch SW5 is opened and the low voltage control path 242 is inactive. Therefore, the DC to DC converter is controlled by the other control paths and loops.

Charge control switch SW4 may be a single switch or may have a diode D1 coupled in parallel with the switch SW4. Switch SW4 is typically controlled by a switch controller (not shown). The switch controller may be configured to open switch SW4 if the charging current reaches a predetermined low charging current level. As such, any charging current would flow through diode D1 in this instance. If the charging current was above the predetermined low charging current level, then the switch controller would close switch SW4. As such, no excess power would be dissipated in diode D1. Diode D1 therefore can prevent current from flowing from the battery system 216 back to the DC to DC converter 220. When the DC to DC converter 220 is a buck converter, this can advantageously prevent the buck converter from operation in an undesirable boost mode.

Figure 3:
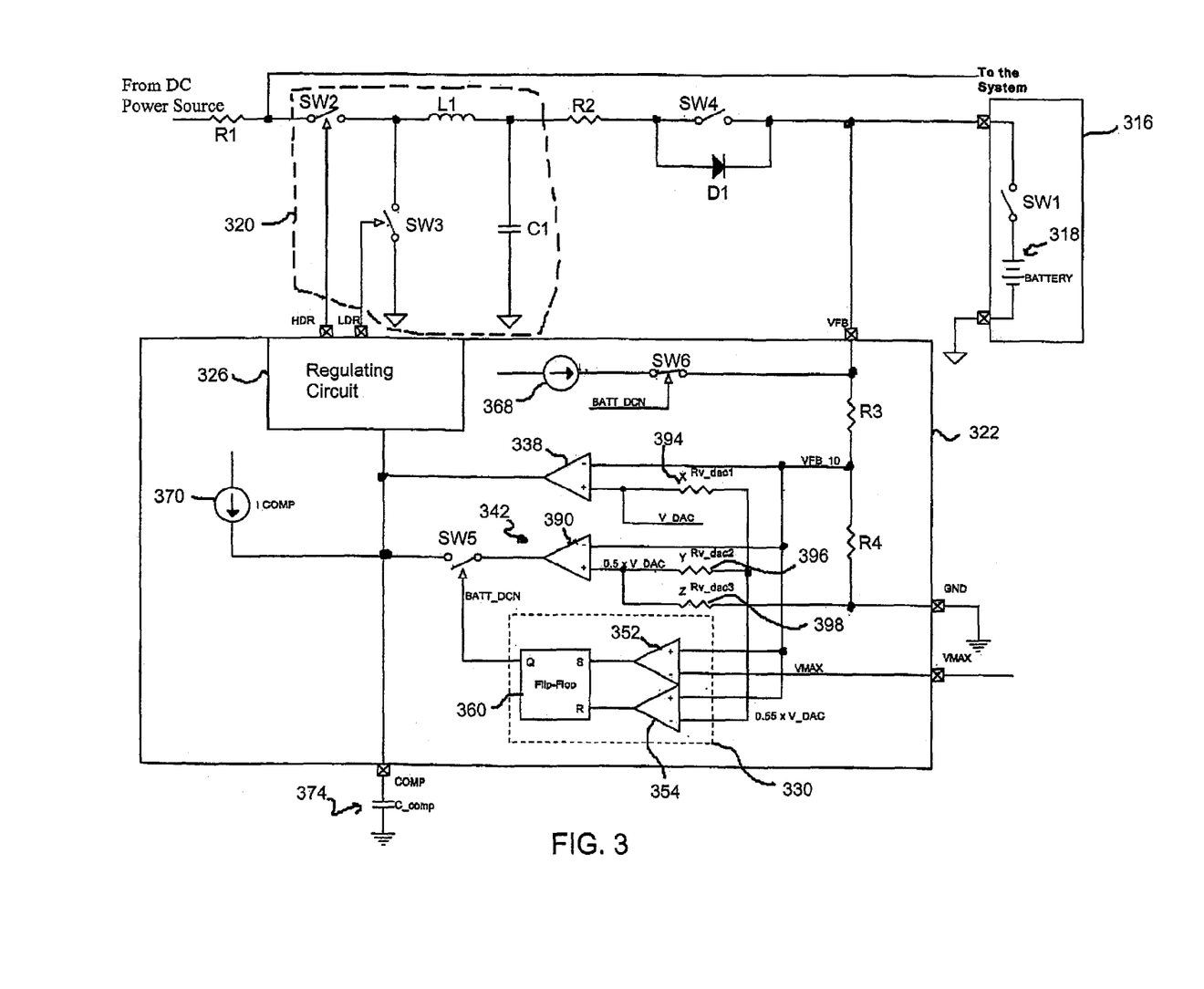
FIG. 3 is a block diagram of another embodiment of a DC to DC controller consistent with the invention for controlling inrush current to a battery system with an internal isolating switch.

Turning to FIG. 3, a block diagram of another embodiment of a DC to DC controller 322 consistent with the invention for controlling inrush current provided by the DC to DC converter 320 to the battery 318 of the battery system 316 is illustrated. Similar components of FIG. 3 are labeled similarly as those of FIG. 2 and hence any repetitive description is omitted herein for clarity. In general, the switch state circuit 330 and the low voltage control loop 342 are modified compared to those shown in the embodiment of FIG. 2.

The switch state detection circuit 330 includes comparators 352, 354 and a flip flop 360. In operation, when switch SW1 opens the output voltage of the DC to DC converter starts to rise until it reaches a predetermined value VMAX, of which VMAX is less than V_DAC. The comparator 352 outputs a high signal when the output voltage of the DC to DC converter reaches VMAX which, in turn, sets the flip flop 360. The flip flop 360 provides a battery switch state signal to switches SW5 and SW6 representative of this condition. Switch SW5 closes to activate the low voltage control loop 342.

Comparator 390 of the low voltage control loop compares a first signal representative of the output voltage of the DC to DC converter, e.g., VFB_10, with a second signal representative of a predetermined DC to DC output voltage level. In this instance, the predetermined DC to DC output voltage level may be equal to the maximum output voltage level of the DC to DC converter reduced by a reduction factor, e.g., 0.5. The reduction factor may be obtained in a variety of ways known in the art such as by using various sized resistors 394, 396, and 398 as a voltage divider to achieve a desired reduction factor.

As such, when switch SW1 closes, the output voltage of the DC to DC converter is adjusted to the predetermined output voltage level. Hence, the inrush current to the battery 318 can be controlled by selecting the predetermined output voltage level. In addition, diode D1 may be provided in parallel with switch SW4. Switch SW4 may be controlled as earlier detailed to remain open until the charging current reaches a predetermined minimum level. Since the charging current is essentially zero when switch SW1 is open, switch SW4 may also be open in this instance. Therefore, the output voltage of the DC to DC converter 320 would be slightly larger than the output voltage at the output of the diode D1 due to the voltage drop on the diode D1. Hence, the comparator 354 of the battery state detection circuit 330 should compare a first value at its inverting input terminal, e.g., 0.55×V_DAC, which is slightly higher than the input to the noninverting input terminal of comparator 390, e.g., 0.5×V_DAC, to account for the voltage drop on diode D1.

Once switch SW1 closes, terminal VFB will see the battery voltage, comparator 354 will generate a positive pulse that will reset the flip flop 360. Hence, switch SW5 will open again and control of the DC to DC converter will be handled by the other control paths and loops of the DC to DC controller. Once the charging current rises above the predetermined charge current level (as may be determined by sense resistor R2 and a comparator), switch SW4 will close and charging can take place through switch SW4. Accordingly, by properly choosing the predetermined DC to DC output voltage level, inrush current can be controlled to a desirable level and even completely eliminated if so desired.

Figure 4:
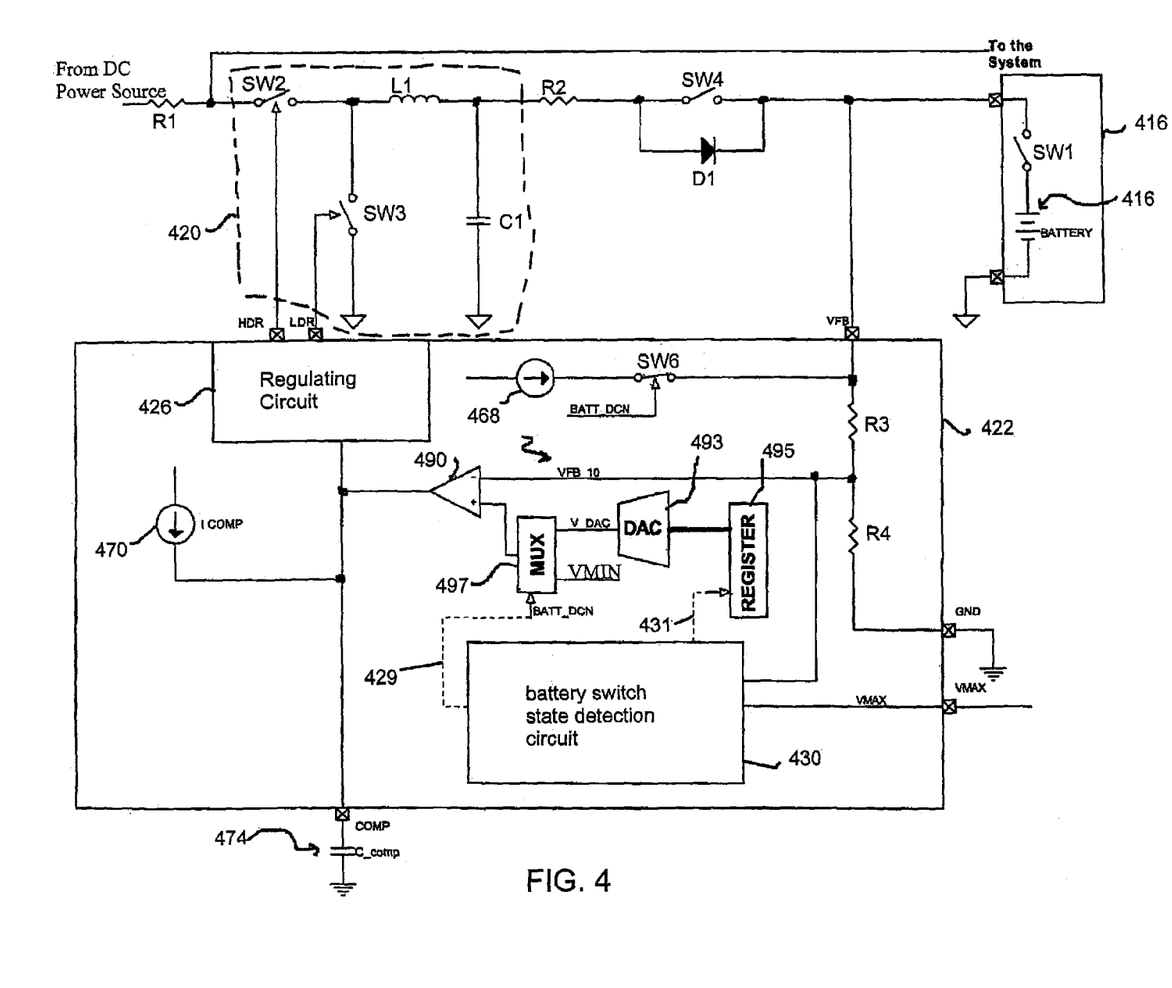
FIG. 4 is a block diagram of yet another embodiment of a DC to DC controller consistent with the invention for controlling inrush current to a battery system with an internal isolating switch.

Turning to FIG. 4, a block diagram of yet another embodiment of a DC to DC controller 422 consistent with the invention is illustrated. In this embodiment, a battery switch state detection circuit 430 senses when the switch SW1 is open or closed. Such a detection circuit 430 may be configured as detection circuits 230 or 330 from the previous embodiments. In general, the comparator 490 provides a control signal to the regulating circuit 426 that drives the output voltage of the DC to DC converter 420 to one of two values. When switch SW1 is closed, the comparator 490 may provide a control signal to drive the output to VMIN, and when switch SW1 is open, the comparator 490 may provide a control signal to drive the output to V_DAC.

For instance, in one embodiment once the battery switch state detection circuit 430 senses that the switch SW1 is open it may send a control signal over path 429 to multiplexer 497 (MUX). The MUX 497 may then provide a signal, VMIN, to the noninverting terminal of the comparator 490. Otherwise if the switch SW1 is open the MUX 497 may provide another signal, V_DAC, to the noninverting terminal of the comparator.

Alternatively, the battery switch state detection circuit 430 may provide a control signal over path 431 to voltage register 495. Such a signal may write into the voltage register a corresponding low digital value. Such a corresponding low digital value may then be converted to an analog value by digital to analog converter (DAC) 493 and then provided, through the MUX 497, to the noninverting input terminal of the comparator 490.

All the switches SW1, SW2, SW3, SW4, SW5 and SW6 in the various embodiments may be any type of switches known in the art such as a transistors including any variety of transistors such as bipolar junction transistors, e.g., PNP and NPN, or field effect transistors such as MOSFETS, e.g., PMOS and NMOS.

Although described in terms of hardware, it will be appreciated that a DC to DC controller consistent with the invention may also be implemented using software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A DC to DC controller for controlling an inrush current from a DC to DC converter to a battery system having an internal isolating switch, said DC to DC controller comprising:
    a first path configured to accept a first input signal representative of an output power level of said DC to DC converter, said first path configured to provide a first control signal;
    a second path configured to accept said first input signal, said second path configured to provide a second control signal if said internal isolating switch is in an open state;
    a regulating circuit configured to accept said first and second control signals and to regulate said output power level to a first level if controlled by said first control signal and to regulate said output power level to a second level if controlled by said second control signal, wherein said regulating circuit is further configured to substantially reduce said inrush current when said internal isolating switch changes from said open state to a closed state; and
    a switch state detection circuit configured to detect a state of said internal isolating switch and provide a switch state control signal representative of a state of said internal isolating switch to said second path.

2. The DC to DC controller of claim 1, wherein said output power level is an output voltage level and said first level is a first output voltage level and said second level is a second output voltage level.

3. The DC to DC controller of claim 2, wherein said battery system comprises a battery having a minimum battery voltage level, and wherein said second output voltage level is within a predetermined range of said minimum battery voltage level for preventing said inrush current from exceeding a predetermined acceptable inrush current level when said internal isolating switch changes from said open state to a closed state.

4. The DC to DC controller of claim 2, wherein said battery system comprises a battery having a minimum battery voltage level, and wherein said second output voltage level is less than or equal to said minimum battery voltage level to eliminate said inrush current when said internal isolating switch changes from said open state to a closed state.

5. The DC to DC controller of claim 1, wherein said output power level is an output voltage level of said DC to DC converter and wherein said switch state detection circuit comprises a first comparator configured to compare a first comparison signal representative of said output voltage level of said DC to DC converter with a second comparison signal representative of a predetermined maximum voltage level of said DC to DC converter, said switch state detection circuit providing said switch state control signal representative of said open state of said internal isolating switch if said first comparison signal is greater than said second comparison signal.

6. The DC to DC controller of claim 1, wherein said output power level is an output voltage level of said DC to DC converter and said second level is a second output voltage level, and wherein said second path further comprises a comparator configured to accept a first comparison signal representative of said output voltage level of said DC to DC converter and a second comparison signal representative of said second output voltage level to drive said output voltage level to said second voltage level if said internal isolating switch is in said open state.

7. The DC to DC controller of claim 1, wherein said regulating circuit comprises a pulse width modulation (PWM) circuit configured to provide a PWM control signal.

8. An electronic device comprising:
a battery system comprising a rechargeable battery and an internal isolating battery switch coupled to said rechargeable battery;
a DC to DC converter configured to accept an input power level from a DC power source and provide an output power level to said battery system for recharging said rechargeable battery; and
a DC to DC controller for controlling an inrush current from said DC to DC converter to said battery system, said DC to DC controller comprising:
a first path configured to accept a first input signal representative of said output power level, said first path configured to provide a first control signal;
a second path configured to accept said first input signal and provide a second control signal if said internal isolating battery switch is in an open state;
a regulating circuit configured to accept said first and second control signals and to regulate said output power level to a first level if controlled by said first control signal and to regulate said output power level to a second level if controlled by said second control signal, wherein said regulating circuit is further configured to substantially reduce said inrush current when said internal isolating battery switch changes from said open state to a closed state; and
a switch state detection circuit configured to detect a state of said internal isolating battery switch and provide a switch state control signal representative of a state of said internal isolating battery switch to said second path.

9. The electronic device of claim 8, wherein said output power level is an output voltage level and said first level is a first output voltage level and said second level is a second output voltage level.

10. The electronic device of claim 9, wherein said rechargeable battery has a minimum battery voltage level, wherein said second output voltage level is within a predetermined range of said minimum battery voltage level for preventing said inrush current from exceeding a predetermined acceptable inrush current level when said internal isolating battery switch changes from said open state to a closed state.

11. The electronic device of claim 9, wherein said rechargeable battery has a minimum battery voltage level, wherein said second output voltage level is less than or equal to said minimum battery voltage level to eliminate said inrush current when said internal isolating battery switch changes from said open state to a closed state.

12. The electronic device of claim 8, wherein said output power level is an output voltage level of said DC to DC converter and wherein said switch state detection circuit comprises a first comparator configured to compare a first comparison signal representative of said output voltage level of said DC to DC converter with a second comparison signal representative of a predetermined maximum voltage level of said DC to DC converter, said switch state detection circuit providing said switch state control signal representative of said open state if said first comparison signal is greater than said second comparison signal.

13. The electronic device of claim 8, wherein said output power parameter is an output voltage level of said DC to DC converter and said second level is a second output voltage level, and wherein said second path further comprises a comparator configured to accept a first comparison signal representative of said output voltage level of said DC to DC converter and a second comparison signal representative of said second output voltage level to drive said output voltage level to said second voltage level if said internal isolating battery switch is in said open state.

14. A DC to DC controller for controlling an inrush current from a DC to DC converter to a battery system having an internal isolating switch, said DC to DC controller comprising:
a first path configured to accept a first input signal representative of an output power level of said DC to DC converter, said first path configured to provide a first control signal;
a second path configured to accept said first input signal, said second path configured to provide a second control signal if said internal isolating switch is in an open state;
a regulating circuit configured to accept said first and second control signals and to regulate said output power level to a first level if controlled by said first control signal and to regulate said output power level to a second level if controlled by said second control signal; and
a switch state detection circuit configured to detect a state of said internal isolating switch and provide a switch state control signal representative of a state of said internal isolating switch to said second path, wherein said output power level is an output voltage level of said DC to DC converter and wherein said switch state detection circuit comprises a first comparator configured to compare a first comparison signal representative of said output voltage level of said DC to DC converter with a second comparison signal representative of a predetermined maximum voltage level of said DC to DC converter, said switch state detection circuit providing said switch state control signal representative of said open state of said internal isolating switch if said first comparison signal is greater than said second comparison signal.

15. An electronic device comprising:
a battery system comprising a rechargeable battery and an internal isolating battery switch coupled to said rechargeable battery;
a DC to DC converter configured to accept an input power level from a DC power source and provide an output power level to said battery system for recharging said rechargeable battery; and
a DC to DC controller for controlling an inrush current from said DC to DC converter to said battery system, said DC to DC controller comprising:
   a first path configured to accept a first input signal representative of said output power level, said first path configured to provide a first control signal;
   a second path configured to accept said first input signal and provide a second control signal if said internal isolating battery switch is in an open state;
   a regulating circuit configured to accept said first and second control signals and to regulate said output power level to a first level if controlled by said first control signal and to regulate said output power level to a second level if controlled by said second control signal; and
   a switch state detection circuit configured to detect a state of said internal isolating battery switch and provide a switch state control signal representative of a state of said internal isolating battery switch to said second path, wherein said output power level is an output voltage level of said DC to DC converter and wherein said switch state detection circuit comprises a first comparator configured to compare a first comparison signal representative of said output voltage level of said DC to DC converter with a second comparison signal representative of a predetermined maximum voltage level of said DC to DC converter, said switch state detection circuit providing said switch state control signal representative of said open state if said first comparison signal is greater than said second comparison signal.

* * * * *

UNITED STATES PATENT AND TRADEMARK OFFICE
CERTIFICATE OF CORRECTION

PATENT NO. : 7,203,048 B2 Page 1 of 1
APPLICATION NO. : 10/431815
DATED : April 10, 2007
INVENTOR(S) : Shyr et al.

It is certified that error appears in the above-identified patent and that said Letters Patent is hereby corrected as shown below:

On the Title Page, Item (73), in "Assignee", delete "02Micro" and insert -- O2Micro --, therefor.

Signed and Sealed this

Nineteenth Day of August, 2008

JON W. DUDAS
*Director of the United States Patent and Trademark Office*